United States Patent [19]

Deutsch

[11] Patent Number: 5,802,171
[45] Date of Patent: Sep. 1, 1998

[54] KEYPAD ENLARGER KIT

[75] Inventor: Brian M. Deutsch, Maple Valley, Wash.

[73] Assignee: APC/Foursum, Kent, Wash.

[21] Appl. No.: 573,281

[22] Filed: Dec. 15, 1995

[51] Int. Cl.[6] .................................................. H04M 1/00
[52] U.S. Cl. .......................... 379/419; 379/447; 379/370; 379/368
[58] Field of Search .............................. 379/447, 370, 379/368, 369, 450; 235/145 R, 1 D; 200/5 D, 5 E, 530, 552, 239; D14/244, 247, 240, 246

[56] References Cited

U.S. PATENT DOCUMENTS

| | | | |
|---|---|---|---|
| D. 262,215 | 12/1981 | Obst | D14/244 |
| 3,927,282 | 12/1975 | Firstenberg | 379/447 |
| 3,995,123 | 11/1976 | Wilson | 379/368 |
| 4,002,855 | 1/1977 | Schiffman et al. | 379/450 |
| 4,160,136 | 7/1979 | McGough | 379/368 |
| 4,243,846 | 1/1981 | Lenaerts et al. | 379/368 |
| 4,734,679 | 3/1988 | Haskins | 379/369 |
| 4,845,748 | 7/1989 | Bohannon | 379/368 |
| 4,862,499 | 8/1989 | Jekot et al. | 379/368 |
| 4,989,240 | 1/1991 | Fuse et al. | 379/368 |

*Primary Examiner*—Dwayne Bost
*Assistant Examiner*—Keith Ferguson
*Attorney, Agent, or Firm*—Glenn D. Bellamy; David P. Campbell

[57] ABSTRACT

A keypad enlarger kit (10) including a front cover plate (22), a plurality of large pushbuttons (24), a cushion pad (26), and a backing plate (28). Keypad enlarger kit (10) is adapted to be mounted to a front panel (15) of a conventional pay telephone (12) in a manner so that large pushbuttons (24) overly telephone keypad (14) and provide larger pushbuttons for selection by a user.

9 Claims, 7 Drawing Sheets

KEYPAD ENLARGER KIT

TECHNICAL FIELD

The present invention pertains to pushbutton keypads, and more particularly, to an apparatus that provides an overlay to enlarge the size of pushbuttons for each pushbutton of a telephone keypad.

BACKGROUND INFORMATION

Pushbutton telephone keypads very often have pushbuttons that are closely grouped and, as a result, it is easy to depress accidently two or more buttons with one finger. This can especially be a problem for someone wearing gloves and for physically challenged persons. This problem also exists with a variety of other keypads, such as credit card verification keypads, security lock keypads, and the like. The present invention is directed to eliminating the problem of accidently depressing wrong keypad pushbuttons and providing an enlarged keypad for ease of use by visually and physically impaired persons.

DISCLOSURE OF THE INVENTION

Briefly described, the present invention comprises a keypad enlarger kit for use in combination with a telephone keypad having a plurality of pushbuttons. The kit includes a plurality of large pushbuttons, each having a front surface area greater than the front surface area of a telephone pushbutton. Each large pushbutton is adapted to at least partially overlay a telephone pushbutton, so that depression of a large pushbutton causes depression of a corresponding telephone pushbutton. The kit also includes a cover plate for mounting to the telephone. The cover plate is adapted to keep the large pushbuttons, as they are depressed, in position over their corresponding telephone pushbuttons.

According to an aspect of the invention, the cover plate includes a plurality of openings, one for each large pushbutton, so that each pushbutton, in its non-depressed position, extends outwardly of the cover plate. Preferably, the cover plate includes a raised rim around each opening, so that the depth of the cover plate defining the openings is increased. This provides added surface to confine and guide the large pushbuttons as they are depressed.

Typically, telephones include a recessed telephone number display panel for displaying a card with the phone's telephone number. According to an aspect of the invention, the cover plate includes a raised block having a height and width to closely fit within the recessed telephone number display panel. This raised block provides an added secure fit for the kit to the phone.

According to another aspect of the invention, the kit also includes a backing plate positioned between the front cover plate and the telephone. The backing plate includes a plurality of openings equal in number to the number of telephone pushbuttons. Each telephone pushbutton projects through an opening in the backing plate. In essence, the backing plate functions as a template for positioning the kit over the telephone keypad. The backing plate is mounted to the front cover plate in a manner that sandwiches the large pushbuttons between the front cover plate and the backing plate, yet provides room for the large pushbuttons to be depressed.

According to another aspect of the invention, the kit also includes a cushion between the large pushbuttons and the front panel. The cushion engages portions of the outer large pushbuttons as these buttons are depressed. The outer large pushbuttons overlay the telephone pushbuttons in an off-set manner so that significant portions of these large pushbuttons do not engage a telephone pushbutton. The cushions are positioned to engage these unsupported portions of the large pushbuttons and provide resistance comparable to that provided by the telephone keypad.

These and other features, objects, and advantages will become more apparent from the following detail description and drawings and claims, which are incorporated herein as part of the disclosure of the invention.

BRIEF DESCRIPTION OF THE DRAWINGS

Like reference numerals refer to like parts throughout the several views, wherein.

BEST MODE FOR CARRYING OUT INVENTION

Figure 1:
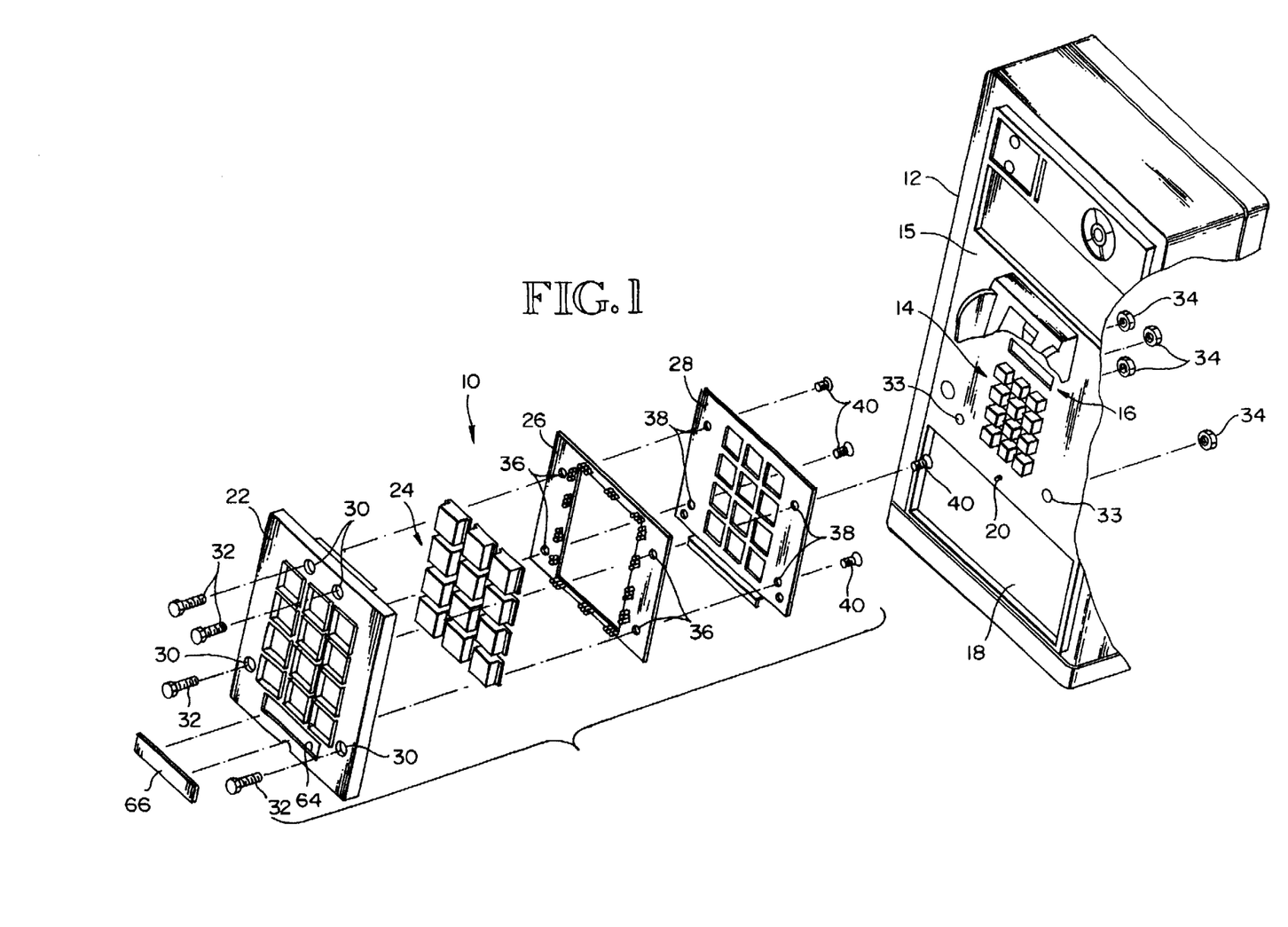
FIG. 1 is an exploded pictorial view of the keypad enlarger kit of the present invention and a conventional pay phone.

In FIG. 1, the keypad enlarger kit of the present invention is designated by reference numeral 10. Kit 10 is designed to be secured to a conventional pushbutton pay telephone 12. Pay phone 12 includes, among other things, a twelve button keypad 14, a cover panel 15, a rectangular, recessed telephone number display 16, and an instruction panel 18. Some phones include a recessed screw 20, which provides access to instruction panel 18.

Keypad enlarger kit 10 includes a front cover plate 22, a set of twelve large keypad pushbuttons 24, a cushion pad 26, and a backing plate 28. Front cover plate 22 includes a set of four hex-shaped bolt holes 30 for receiving four hex-head bolts 32, which mount kit 10 to cover panel 15 of phone 12. Hex-shaped holes 30 allow hex-head bolts 32 to lie flush with plate 22, making removal of kit 10 from phone 12 more difficult without removal of cover panel 15. Two corresponding bolt holes 33 are made in cover panel 15. This is the only modification required to the original phone equipment for installation of the kit 10. Hex-head bolts 32 extend through bolt holes 33, and fastener nuts 34 secure bolts 32 to cover panel 15. Cushion pad 26 and backing plate 28 each include a set of four holes 36, 38 (respectively) for receiving a set of four screws 40, to secure plates 26, 28 and keypad pushbuttons 24 to front cover plate 22.

Figure 2:
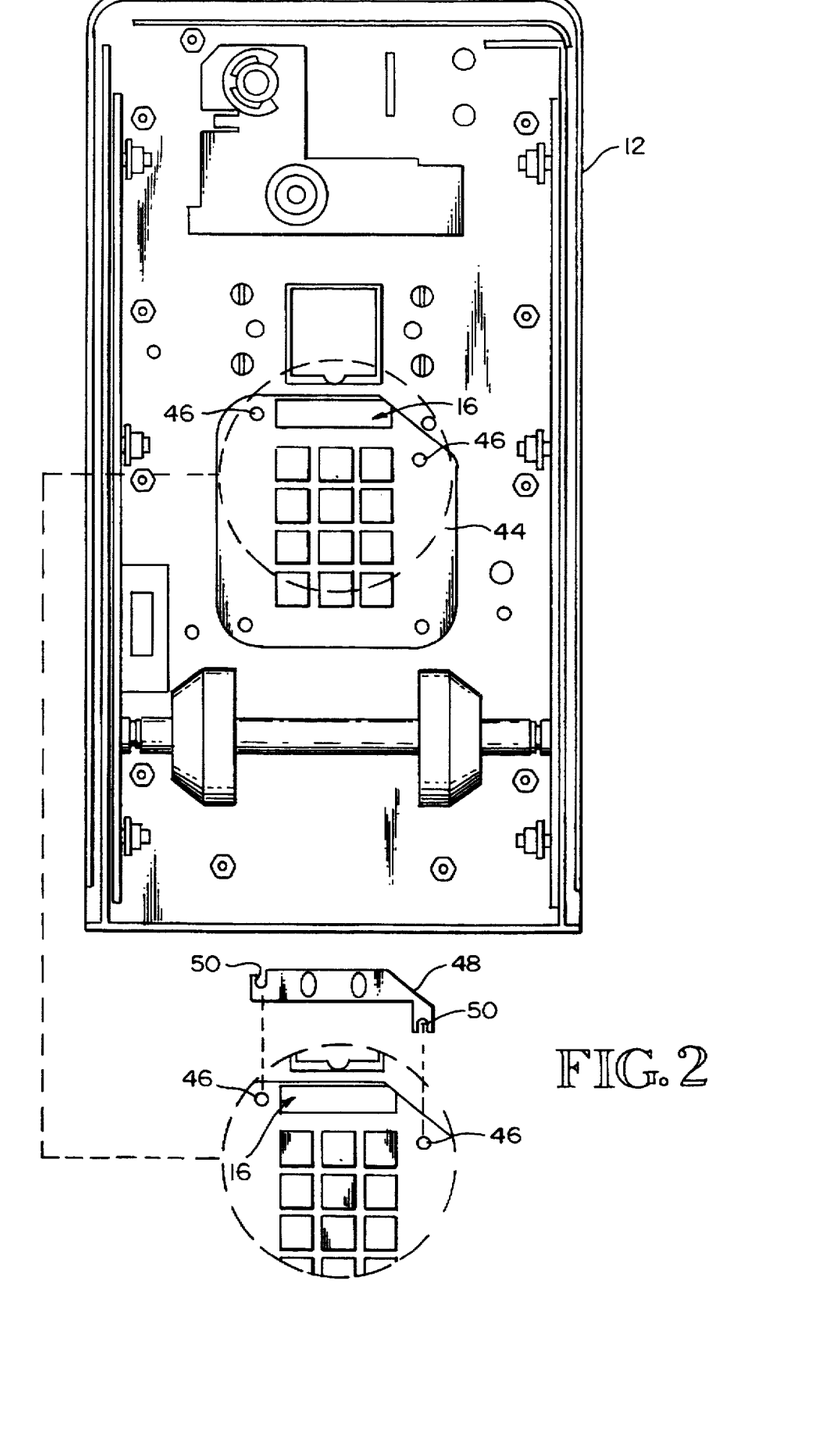
FIG. 2 is an inside front view of the pay phone of FIG. 1 with its front cover removed to illustrate the phone number backing plate.
Figure 3:
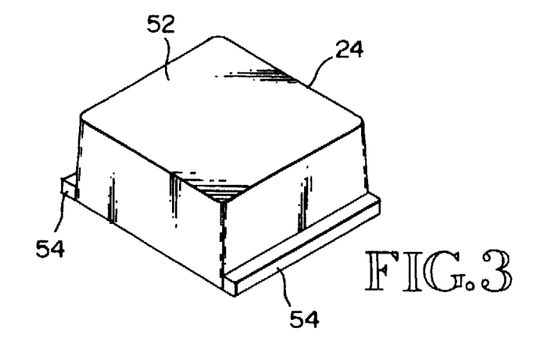
FIGS. 3–6 are various views showing the shape and dimensions of a pushbutton of the kit of FIG. 1.

In FIG. 2, the front cover panel 15 and keypad 14 of pay phone 12 have been removed to illustrate an internal template 44 through which the original keypad pushbuttons extend. Template 44 includes a pair of prongs 46, which hold a back piece 48. Back piece 48 includes a pair of slots 50, which straddle prongs 46 and, along with appropriate screws, mount back piece 48 behind the telephone number display panel 16. Back piece 48 acts as a back support for holding a telephone number card in the original installation.

Figure 4:
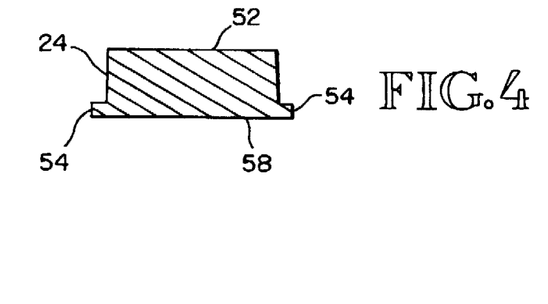
Figure 5:
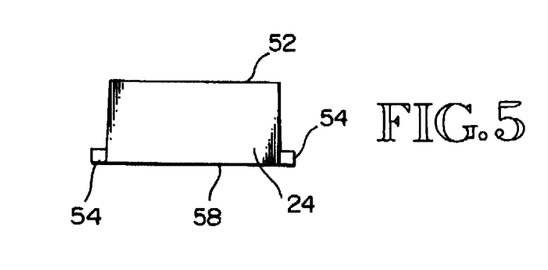
Figure 6:
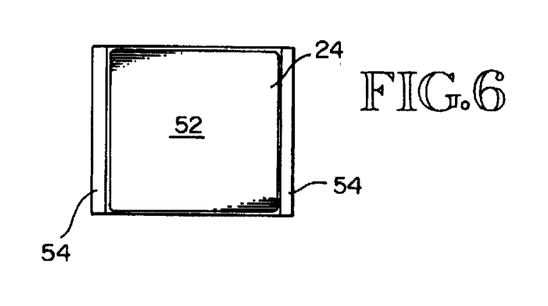

In FIGS. 3–6, an individual, large keypad pushbutton 24 is illustrated. Keypad pushbutton 24 includes a front surface 52, which is pushed by the hand of a user. The surface area of surface 52 is much larger than the area of a conventional keypad pushbutton. For example, whereas conventional buttons have a surface area of approximately 0.16 square inches, keypad button 24 has a front surface area of approximately 0.4 square inches. Button 24 also includes a pair of rear flanges 54. Flanges 54 are flush with the back edge of button 24, as shown in FIGS. 4 and 5. Flanges 54 prevent buttons 24 from falling out through front cover plate 22. The back surface 58 of button 24 is a solid surface, and it is the portion of button 24 that engages the original keypad buttons on the pay phone.

Figures 7, 9:
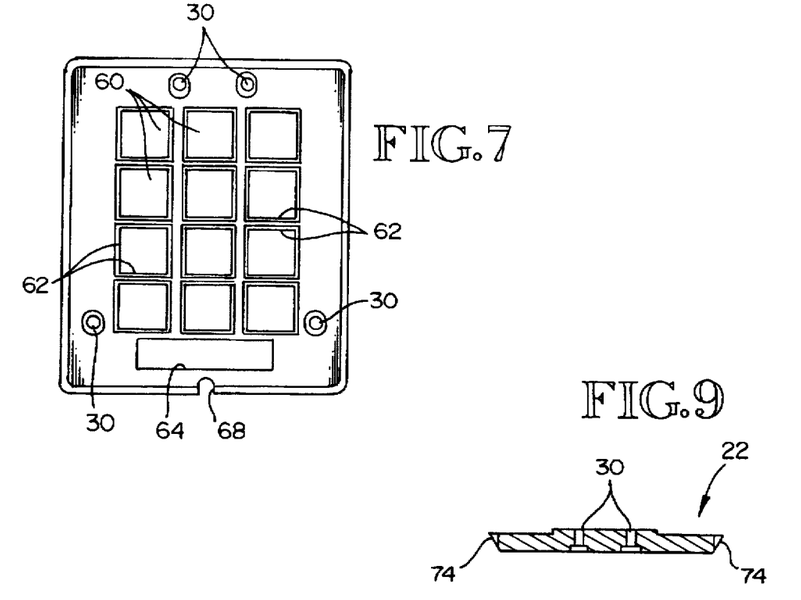
FIGS. 7–11 are various views showing the design of the front plate of the kit of FIG. 1.
Figure 8:
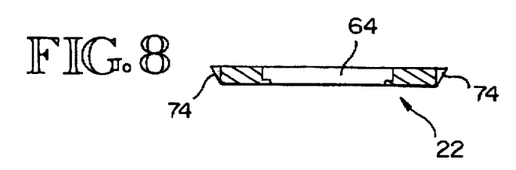
Figure 10:
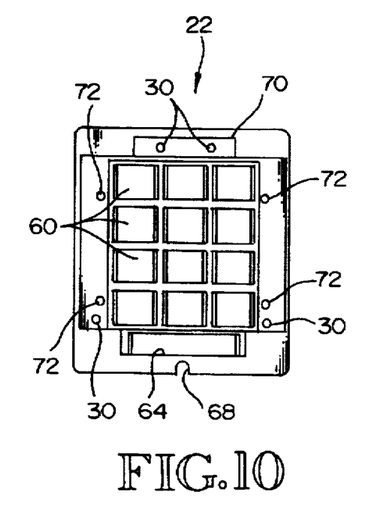
Figure 11:
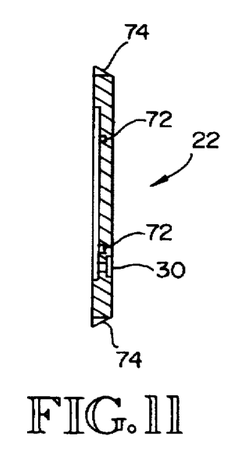
Figure 12:
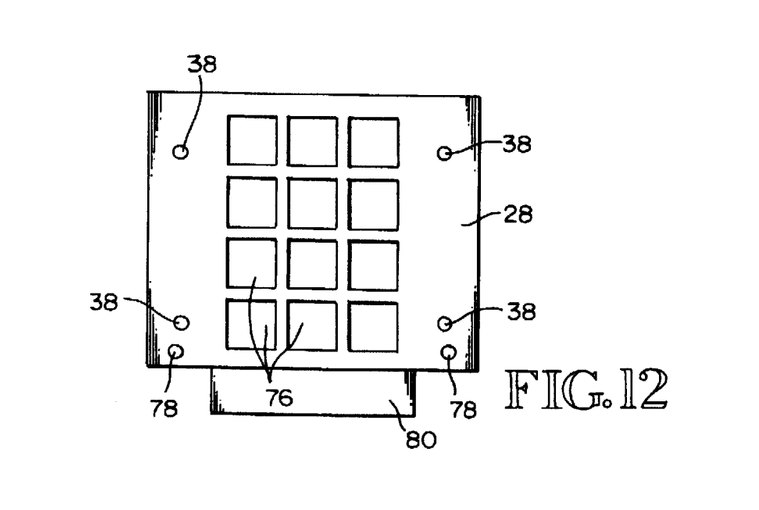
FIGS. 12–15 are various views showing the design of the back plate of the kit of FIG. 1.
Figure 13:
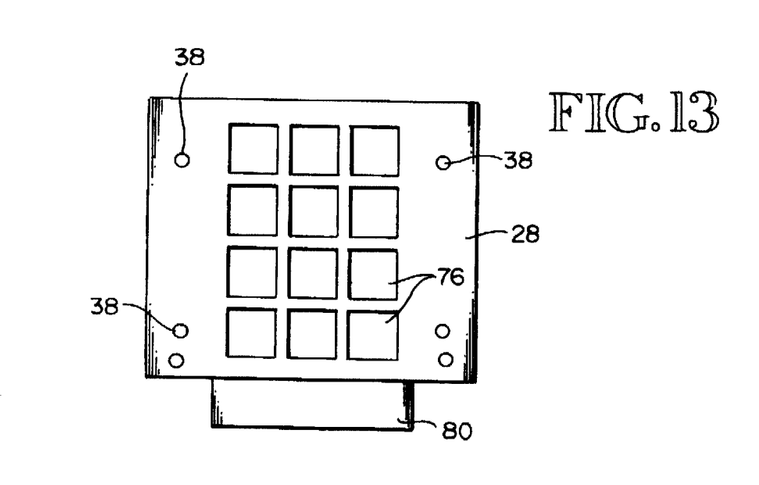
Figure 14:
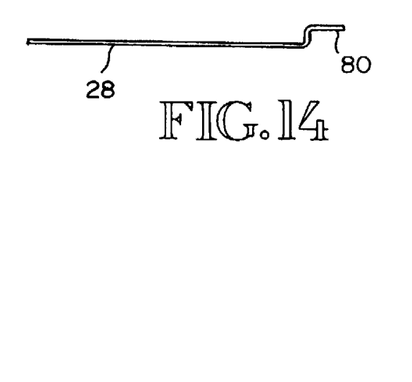
Figure 15:
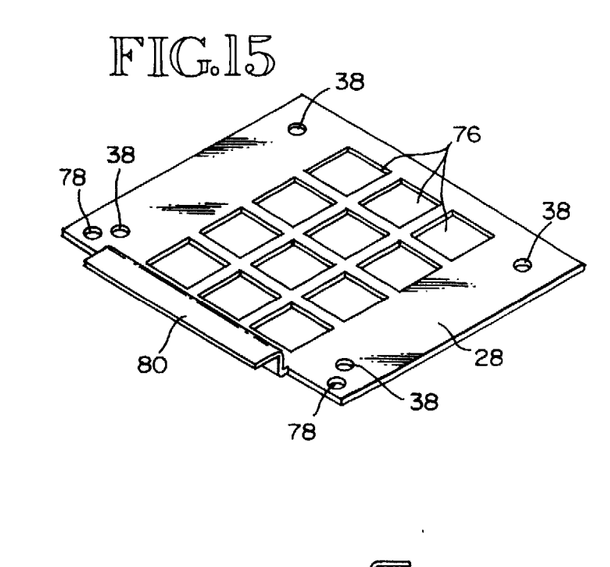
Figures 16, 17, 18, 19:
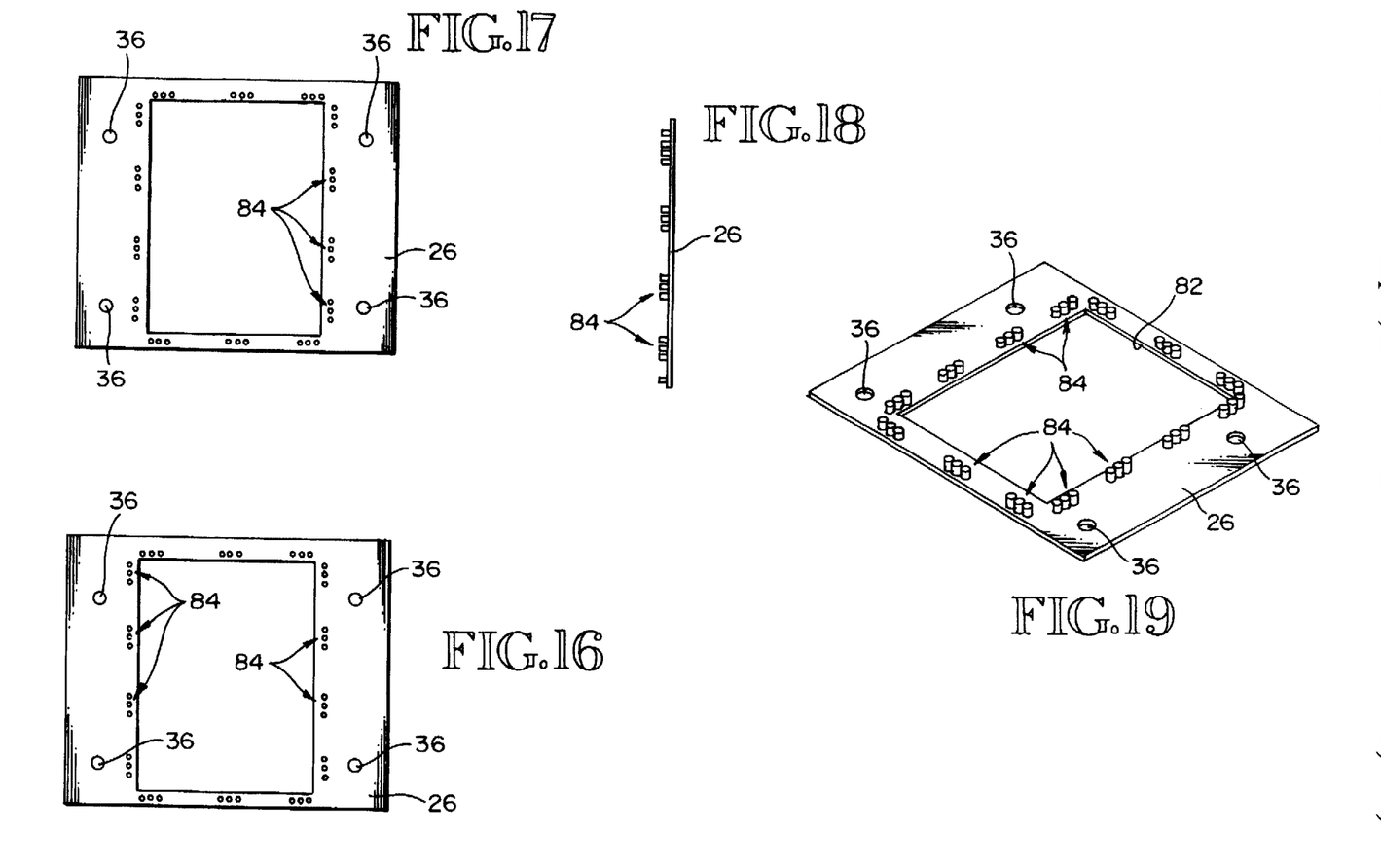
FIGS. 16–19 are various views showing the design of the cushion pad of the kit of FIG. 1.

FIGS. 7–11 illustrate front cover plate 22. FIG. 7 is a front view of cover plate 12, while FIG. 10 is a back view. Front cover plate 12 includes a set of twelve rectangular openings 60, which are approximately the same width and height of pushbuttons 24. Each opening 60 is defined, on the front side of plate 22, by a raised rim or chimney 62. Chimney 62 extends around each opening 60 and provides a deeper surface area to guide pushbuttons 24 as they are depressed.

Cover plate 22 includes a lower rectangular opening 64, which receives a phone number insert card 66 (FIG. 1). Front cover plate 22 also includes a lower notch 68 along the bottom edge of plate 22. Notch 68 provides access to screw 20 (FIG. 1) of the pay phone. A raised rectangular block 70 (FIG. 10) is provided on the back side upper region of cover plate 22. Raised block 70 is of approximately the same dimensions as recessed display panel 16 of the pay phone (FIG. 1). Raised block 70 fits into recessed panel 16 when kit 10 is mounted onto panel 15 of the pay phone. This provides a more secure mounting arrangement for kit 10.

The back side of cover plate 22 also includes a set of four threaded taps 72, which receive screws 40 (FIG. 1) and secure cushion pad 26 and backing plate 28 to front cover plate 22. Additionally, the side edges 74 of front cover plate 22 are beveled, from front to back, to make prying a tool behind plate 22 more difficult. The kit 10 of the present invention was designed for public pay phones, many of which are subject to vandalism. However, it is believed that the present invention has general utility for any type of pushbutton keypad, alpha-numeric or otherwise.

FIGS. 12–15 illustrate backing plate 28 in more detail. Backing plate 28 includes a set of twelve square openings 76, which are sized to closely receive the pushbuttons of the pay phone. As such, backing plate 28 functions as a type of template to position correctly kit 10 onto phone 12. Holes 38 receive screws 40 for securing backing plate 28 to the front cover plate, and holes 78 each receive a hex nut bolt 32, for securing the kit to the phone. Backing plate 28 is provided with a lower raised lip 80. Lip 80 is flush behind telephone number display opening 64 (FIG. 7) when backing plate 28 is mounted to front cover plate 22. Lip 80 acts as a backing behind the telephone number display opening 64.

FIGS. 16–19 illustrate cushion pad 26 in greater detail. Cushion pad 26 includes the four openings 36 for screws 40. Cushion pad 26 also includes a large central rectangular opening 82, which is approximately the size of the area defined by the outer perimeter of openings 76 in backing plate 28. Along the edge regions of opening 82 are provided a plurality of sets of three raised cushions 84. Preferably, cushions 84 and cushion pad 26 are made of a elastomeric, rubber, or sponge material and preferably cushions 84 themselves are hollow so that they are easily collapsible and resilient. The height of raised cushions 84 is sufficient to extend to the point that the keypad buttons 14 of the pay phone project through openings 76 of backing plate 28. In this manner, the upper edges of raised cushions 84 are flush with the front pushbutton surfaces of each keypad button 14.

Figure 20:
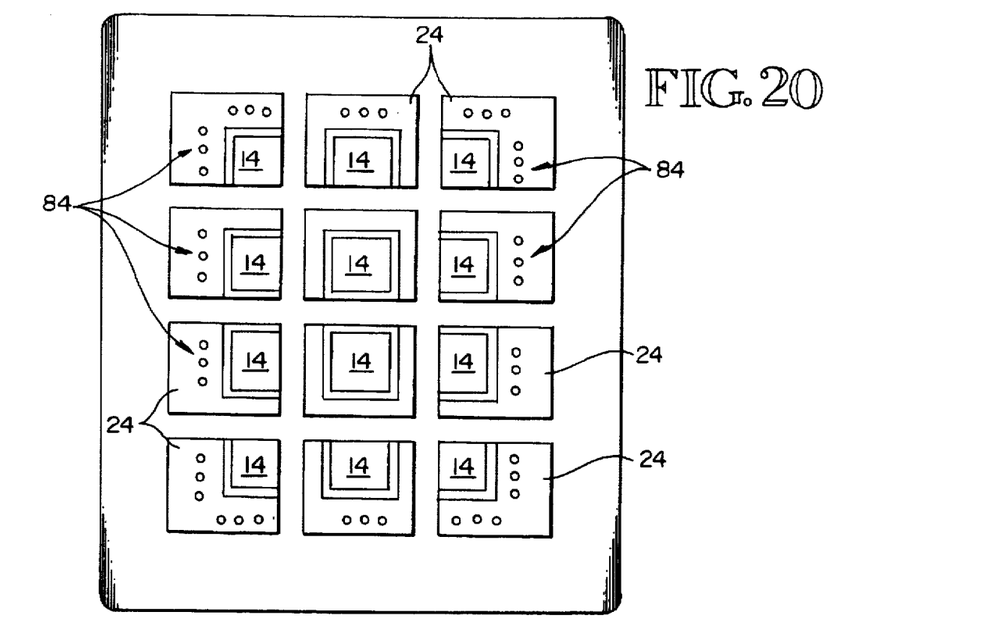
FIG. 20 is a schematic view illustrating the relative sizes of the keypad pushbuttons of the kit of FIG. 1 and the keypad pushbuttons of a conventional pushbutton telephone.

FIG. 20 is a schematic diagram illustrating the relative positions and sizes of phone keypad buttons 14 and larger pushbuttons 24 of the kit. As can be seen, kit buttons 24 are more than three times the size of phone buttons 14. However, the relative sizes of buttons 14, 24 can vary and the present invention is not meant to be limited to any particular surface area ratios of pushbuttons 14, 24, other than the fact that kit buttons 24 are larger than phone buttons 14.

Cushions 84 are illustrated in FIG. 20 as they are located around pushbuttons 24. As can be seen, the four corner pushbuttons are provided with two sets of three cushions 84, the inner two pushbuttons are not provided with any cushions, and the remaining outer pushbuttons each have one set of three cushions 84. The center two pushbuttons completely overly their corresponding telephone pushbuttons 14, and for this reason are not provided with any corresponding cushions. The remaining pushbuttons only partially overly their corresponding telephone pushbuttons. For these pushbuttons, cushions 84 provide balance to depression of pushbuttons 24. Cushions 84 cause pushbuttons 24 to be depressed subject to a uniform resistance, across their back surfaces, from the combination of cushions 84 and pushbuttons 14. As a result, a firm pushbutton feel is achieved.

Figure 21:
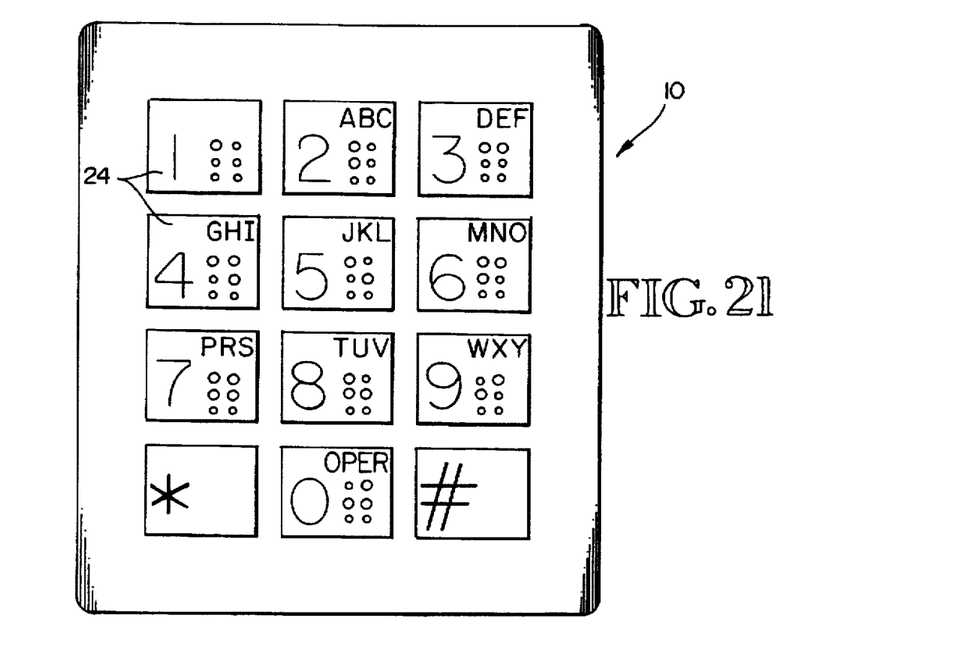
FIG. 21 is a front view of the kit of FIG. 1, with numbering, lettering, and braille added to the keypad.

In FIG. 21, the numbers, letters, braille, and symbols have been added to pushbuttons 24 so that the buttons appear, with alpha-numeric characters, as they would with kit 10 mounted over the keypad 14 of the pay phone. The particular numbering on the pushbuttons forms no part of the present invention, and the kit 10 described herein can be used for keypads having any type of numbering, lettering, or other symbols or notations.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A keypad enlarger kit for use in combination with a telephone keypad having a plurality of pushbuttons, comprising a plurality of large pushbuttons, each having a front surface area greater than the front surface area of a telephone pushbutton, each large pushbutton adapted to at least partially overlay a telephone pushbutton, so that depression of a large pushbutton causes depression of a corresponding telephone pushbutton, and a cover plate for mounting to the telephone, the cover plate adapted to keep the large pushbuttons, as they are depressed, in position over their corresponding telephone pushbuttons;

wherein the telephone includes a recessed telephone number display panel and the cover plate includes a raised block having a height and width to closely fit with the recessed telephone number display panel.

2. The kit of claim 1, wherein the telephone includes an access screw and the cover plate includes a notched opening providing access to the screw.

3. A keypad enlarger kit for use in combination with a telephone keypad having a plurality of pushbuttons, comprising a plurality of large pushbuttons, each having a front surface area greater than the front surface area of a telephone pushbutton, each large pushbutton adapted to at least partially overlay a telephone pushbutton, so that depression of a large pushbutton causes depression of a corresponding telephone pushbutton, and a cover plate for mounting to the telephone, the cover plate adapted to keep the large pushbuttons, as they are depressed, in position over their corresponding telephone pushbuttons, and a backing plate adapted to be positioned between the front cover plate and the telephone, the backing plate including a plurality of openings equal in number to the number of telephone pushbuttons, each telephone pushbutton adapted to project through an opening in the backing plate.

4. The kit of claim 3, wherein the backing plate is mounted to the front cover plate in a manner that sandwiches the large pushbuttons between the front cover plate and the backing plate, yet provides room for the large pushbuttons to be depressed.

5. A keypad enlarger kit for use in combination with a telephone keypad having a plurality of pushbuttons, comprising a plurality of large pushbuttons, each having a front surface area greater than the front surface area of a telephone pushbutton, each large pushbutton adapted to at least partially overlay a telephone pushbutton, so that depression of a large pushbutton causes depression of a corresponding telephone pushbutton, and a cover plate for mounting to the telephone, the cover plate adapted to keep the large pushbuttons, as they are depressed, in position over their corresponding telephone pushbuttons;

wherein the front cover plate includes an opening for a telephone number display card and the backing plate includes a raised lip adapted to provide a back support for the telephone number display card.

6. A keypad enlarger kit for use in combination with a telephone keypad having a plurality of pushbuttons, comprising a plurality of large pushbuttons, each having a front surface area greater than the front surface area of a telephone pushbutton, each large pushbutton adapted to at least partially overlay a telephone pushbutton, so that depression of a large pushbutton causes depression of a corresponding telephone pushbutton, and a cover plate for mounting to the telephone, the cover plate adapted to keep the large pushbuttons, as they are depressed, in position over their corresponding telephone pushbuttons;

wherein the telephone includes a front panel and further including a cushion adapted to be positioned between the large pushbuttons and the front panel, the cushion adapted to engage offset portions of some of the large pushbuttons as the buttons are depressed.

7. The kit of claim 6, wherein some of the large pushbuttons overlay the telephone pushbuttons in an off-set manner so that portions of some large pushbuttons do not engage a telephone pushbutton, the cushions positioned to engage said portions.

8. The kit of claim 6, and further comprising a backing plate adapted to be positioned between the front cover plate and the telephone, the backing plate including a plurality of openings equal in number to the number of telephone pushbuttons, each telephone pushbutton adapted to project through an opening in the backing plate, the cushion adapted to be positioned between the large pushbuttons and the backing plate.

9. The kit of claim 8, wherein the cushion includes a plurality of collapsible pockets.

* * * * *

UNITED STATES PATENT AND TRADEMARK OFFICE
CERTIFICATE OF CORRECTION

PATENT NO. : 5,802,171
DATED : September 1, 1998
INVENTOR(S) : Brian J. Deutsch

It is certified that error appears in the above-identified patent and that said Letters Patent is hereby corrected as shown below:

Claim 3, col. 5, lines 11 and 12, "comprising" should be -- comprising: --.

Claim 3, col. 5, line 25, after "the backing plate", insert
-- being secured to the cover plate for installation and removal with the cover plate and large pushbuttons as a unit, the backing plate --.

Claim 5, col. 6, line 5, delete "front"; and in line 6, "the backing plate should be -- a backing plate --.

Signed and Sealed this

Fourteenth Day of September, 1999

Attest:

Q. TODD DICKINSON

*Attesting Officer*   *Acting Commissioner of Patents and Trademarks*